Feb. 9, 1965 G. I. ROBERTS 3,168,847
METHOD FOR SEVERING A COIL FORM WINDING ELEMENT
Original Filed May 6, 1955 3 Sheets-Sheet 1

INVENTOR.
GEORGE I. ROBERTS
BY
*Herbert J. Smith*
ATTORNEY

INVENTOR.
GEORGE I. ROBERTS
BY
ATTORNEY

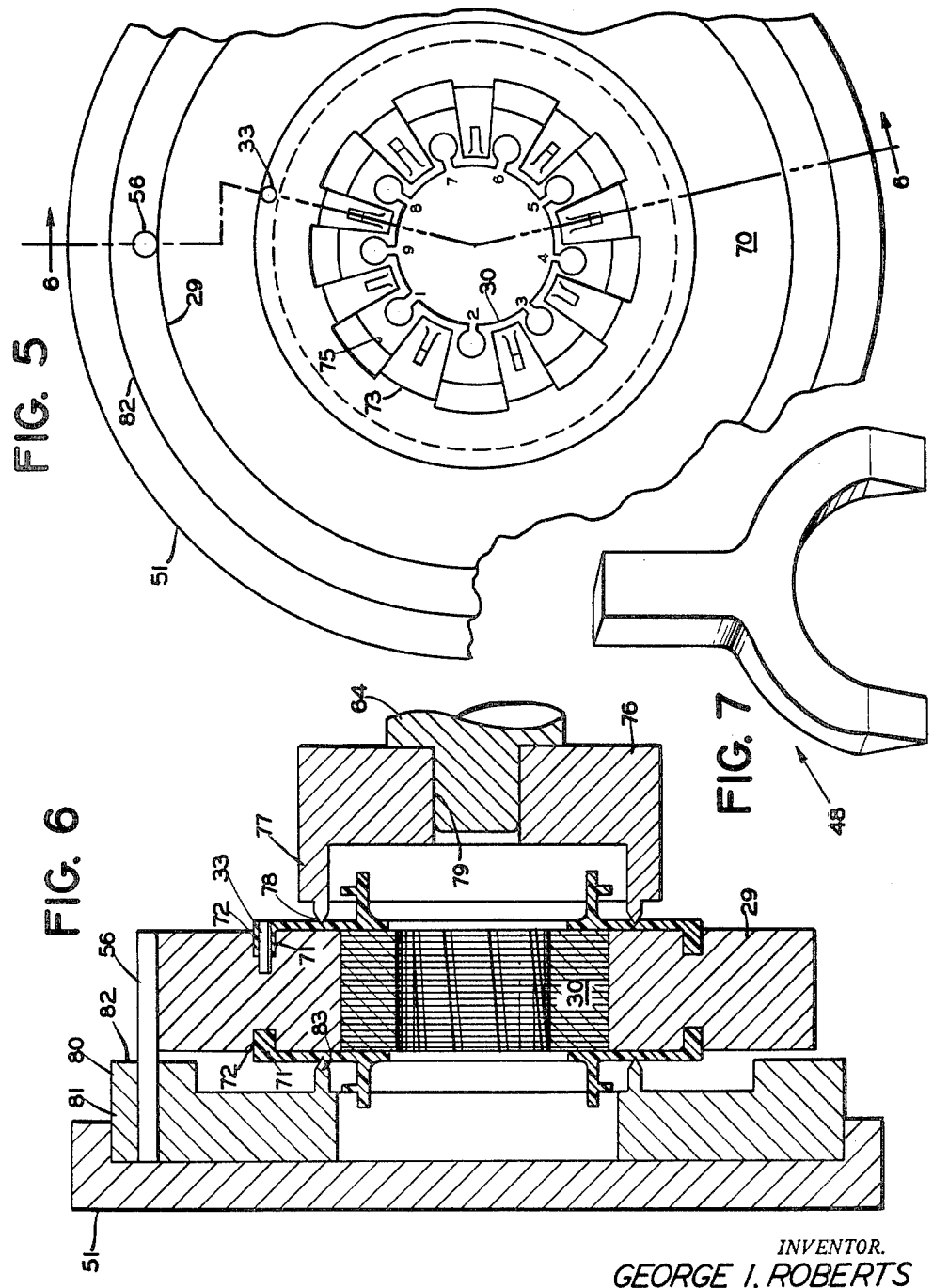

United States Patent Office 3,168,847
Patented Feb. 9, 1965

3,168,847
METHOD FOR SEVERING A COIL FORM WINDING ELEMENT
George I. Roberts, 356 Concord Drive, Maywood, N.J.
Continuation of application Ser. No. 202,038, June 1, 1962, which is a continuation of application Ser. No. 506,564, May 6, 1955. This application Apr. 28, 1964, Ser. No. 364,885
7 Claims. (Cl. 83—13)

The invention relates to the art of coil winding and more particularly to a method for cutting, breaking, or generally disintegrating or severing an expendible, preformed element used for forming and holding the end-turns of coils or wire on a stator during the winding operation, and this application is a continuation of my copending application Serial No. 202,038, filed June 1, 1962, now abandoned, and assigned to The Bendix Corporation, which is a continuation of my application Serial No. 506,564, filed May 6, 1955, and now abandoned.

The present invention may be used, for example, in conjunction with a coil winding machine of the general type described in U.S. Patent No. 2,936,961, granted May 17, 1960, to George I. Roberts, for Stator Coil Winding Device, and assigned to Bendix Aviation Corporation, now by change of name The Bendix Corporation, and is of the general nature of the invention set forth in U.S. Patent No. 2,810,848, granted October 22, 1957, to George I. Roberts, for Method and Means of Stator Coil Forming, and assigned to Bendix Aviation Corporation, now by change of name The Bendix Corporation.

In the aforementioned patents, the stator to be wound is removably affixed within a stator nest which is stationarily positioned in the winding machine. The stator nest is used for supporting and positioning means of the stator during the winding operation, and includes hooks, which support the end-turns or loops of coils wound in the slots of a stator. The stator may be rotated for suitable indexing to position the stator for the particular coil, of a series of coils to be wound according to a desired sequence or predetermined program of coil winding.

The present invention relates to a method of cutting or severing the expendible end-turn forming ring which is used for forming and holding the end turns of a stator of an electrical inductive device. The type of expendible ring for which the present invention is particularly adapted is of the general type of end-turn forming ring set forth in the U.S. Patent No. 2,810,848. However, in the U.S. Patent No. 2,810,848, the end-turn forming rings are adhered on the end faces of the stator within the lateral confines of the stator. In the present application the end-turn forming ring, while disposed in the same relative position on the stator, is not permanently secured to the stator per se, but rather is removably affixed to the stator nest which carries the stator during the winding operation thereof. In the present invention a portion of the end-turn forming ring extends radially beyond the lateral confines of the stator, and said portion is removed from the stator after the complete winding operation and wedging of the coils. The present invention is concerned more specifically with the method of using the tools for cutting off said portion, which is the outer expendible portion, which leaves a multiplicity of inner expendible portions each having a lug thereon which may be removed after the winding and wedging operations are completed.

It is an object of the present invention to provide a novel method for facilitating coil winding operations using expendible end-turn forming means wherein said means is removed after the coil winding operation is completed.

Another object is to provide a method for severing an expendible member used in conjunction with the winding of the stator of an electrical device.

Another object is to provide a method for severing an expendible unitary preformed member used in conjunction with forming the end-turns of coils in a stator stack.

Another object is to provide a novel breaking or cutting method for facilitating the removal of end-turn forming means used in conjunction with the winding of the stator of an electrical device.

Another object is to provide a method for severing the end-turn forming means used in conjunction with coil forming device by simultaneously severing the end-turn forming means on opposed faces of a stator stack to facilitate complete removal of said forming means after a wedging of the coils in their respective slots.

Another object is to provide a method for severing the preformed insulator end-turn forming means by exerting pressure in a predetermined direction on forming rings disposed on opposite ends of a stator stack.

A further object is to provide a method for severing expendible end-turn forming rings by providing score or weakened portions in said forming rings and applying pressure in the area of said score.

The present invention contemplates a novel method for simultaneously cutting or severing expendible end-turn forming rings after the winding and wedging operations of a stator are completed, so that the forming ring may be removed after the coils are properly secured in place. The cutting or breaking device employs means for centering the stator which is held in a stator nest. One form of the device uses annular cutting or shearing portions, while another form of the device uses portions shaped to expand portions of the end-turn forming ring so that said ring is broken at scored areas.

The foregoing and other objects and advantages of the invention will appear more fully hereinafter from consideration of the detailed description which follows taken together with the accompanying drawings wherein several embodiments of the invention are illustrated by way of example. It is to be expressly understood, however, that the drawings are for illustration purposes only and not to be construed as defining the limits of the invention.

In the drawings:

FIGURE 5 is another modification of a view somewhat like FIGURE 1.

FIGURE 6 is a sectional view taken substantially along line 6—6 of FIGURE 5, but showing a cutting off tool in operative position.

FIGURE 7 is one form of a tool used in conjunction with the device shown in FIGURES 3 and 4.

Figure 1:
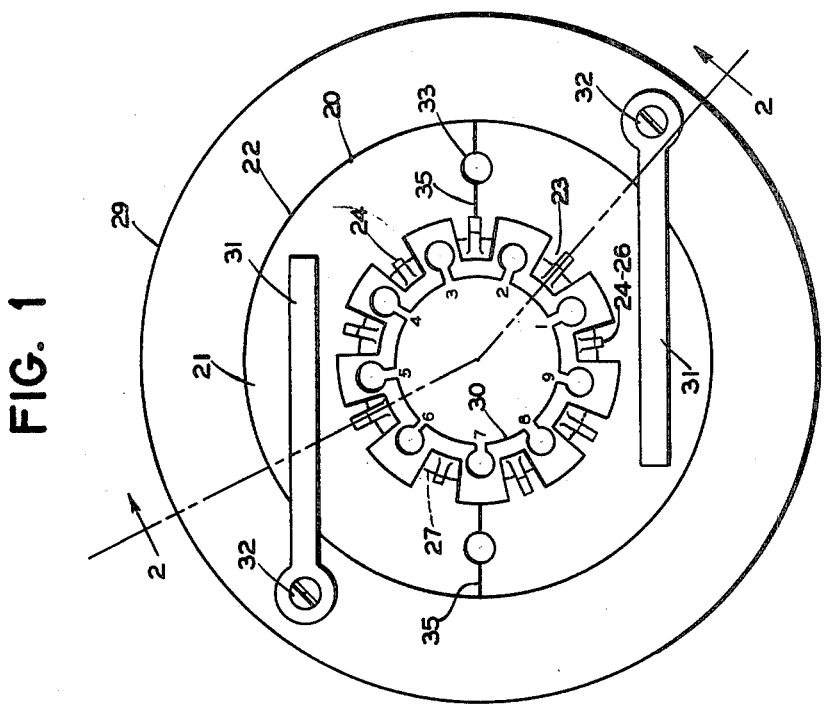
FIGURE 1 is an end view of one form of the invention showing an end-turn forming ring in position on stator nest.
Figure 2:
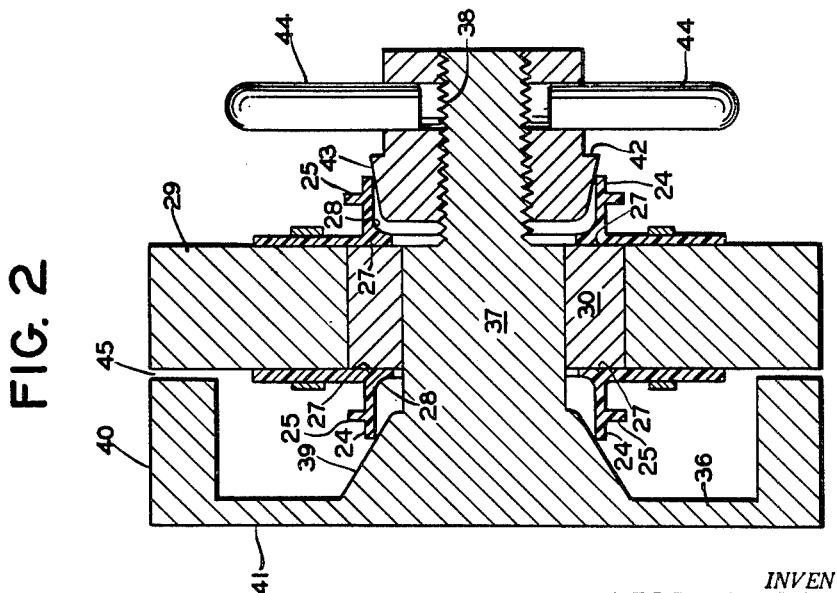
FIGURE 2 is a sectional view taken substantially along lines 2—2 of FIGURE 1, but with one form of the severing tool disposed in operative position.

Referring to the drawings, there is shown an end-turn forming ring, one type of which is represented in FIGURES 1 and 2. The forming ring 20 is made of insulating material, such as plastic, and has a flat, annular portion 21 having a circular peripheral edge 22 with a plurality of toothlike projections 23 displaced in the same plane as the flat, annular portion 21. Each of the projections 23 has a lug 24 extending laterally therefrom at the free nd thereof with certain of said lugs each having a finger 25 thereon. Certain other of said lugs such as 26 are similar to lug 24, but do not have a finger such as 25 thereon. Each of said forming rings 20 has a weakened portion or score 27 formed thereon, on a surface opposite to that to which the lug is formed. In the area where the lug and the toothlike projection intersect there is a thick portion 28.

In placing the pair of forming rings 20 in operative position for winding the stator, a stator nest 29 is in the form of an annular ring having a central bore therethrough, so that the stator 30 may fit therein and be secured thereto in any convenient manner, such as that shown in said aforementioned patents. The end faces of the stator and the end faces of the stator nest are substantially in the same plane, so that each forming ring, such as 20, may be placed on its respective end of the stator and overlie a portion of the stator nest as shown. The toothlike projections 23 of the forming ring are disposed so that they extend between the respective slots of the stator when the forming ring is in proper position for winding the coils in the stator, whereby the end turns may be formed on the lugs as desired.

A pair of flat springs, such as 31, are pivotally mounted as shown by screws 32, to the stator nest 29. A pair of forming ring positioning pins 33 are secured to each face of the stator nest and extend therefrom so that they project through a hole provided in the flat annular portion 21 of the forming ring, whereby the pins 33 are used for properly positioning the forming ring relative to the stator 30 by placing the positioning pins 33 through complementary preformed holes in the flat annular portion 21. While the pins 33 are used for positioning, they are also used for holding the inner portion of the forming ring in position, while the flat springs, such as 31, hold the outer portions of the forming ring adjacent the peripheral edge 22 flat against the stator nest, so that the forming ring does not buckle or appreciably yield when tension is placed on the lugs, such as 24, by the coils of wire as they are being formed during the automatic winding operation thereof.

The device shown in FIGURES 1 and 2 is provided for severing the forming ring 20 into separable parts. The ring 20 has scored or weakened portions, along lines such as indicated by numeral 35, formed on opposite sides of the forming ring in the area of the pins 33 between the peripheral edge 22 and the inner peripheral edge as well as along the scored or weakened portions 27 as heretofore explained. The exact location of the pins 33 is not critical but the pins 33 should be approximately 180° apart.

The tool for severing the forming rings as presented in FIGURES 1 and 2 employs a breaking method for severing the lugs 24 from the outer or flat annular portion 21 of the forming ring. The severing tool as shown in FIGURES 1 and 2 comprises a rear expander and a front expander. The rear expander 36 is a unitary member having a hub 37 with a threaded stud portion 38 on one end thereof and an expander cone portion 39 on the other end thereof. An annular flange 40 is connected to the rear expander cone portion 39 by a web 41. A front expander 42 has a cone portion 43 and is threaded through a central bore thereof, so that the cone portion 43 may be threaded on the threaded stud portion 38 when the handle 44 is rotated in the proper direction.

The hub portion 37 fits through the central bore of the stator stack and when the handle 44 is rotated in the proper direction, the cone portions of the front and rear expanders will engage the outer edges of the lugs 24. As pressure is applied by properly turning the handle 44, the cone portions will force the engaging lugs outwardly until they yield in the weakened or score portions 27. The space 45 between one face of the stator nest 29 and the free edge of the annular flange 40 exists at approximately the moment when the cone portions engage the free ends of the lugs on opposite sides of the stator. When the handle 44 is turned sufficiently so that the annular flange engages the stator nest, the lugs will all have been severed or sufficiently bent so that they will be readily removed as soon as pressure is applied on the respective lugs by the operator, who may readily remove each of the lugs from the annular flange portion 21 of the forming ring 20. After the handle is unscrewed so that the expander portions may be separated from the stator, and the flat springs 31 have been disengaged from the forming ring 20, the flat annular portion 21 may be severed on the score line, such as 35, by bending the opposite sides of each forming ring 20 away from the stator nest.

Figure 3:
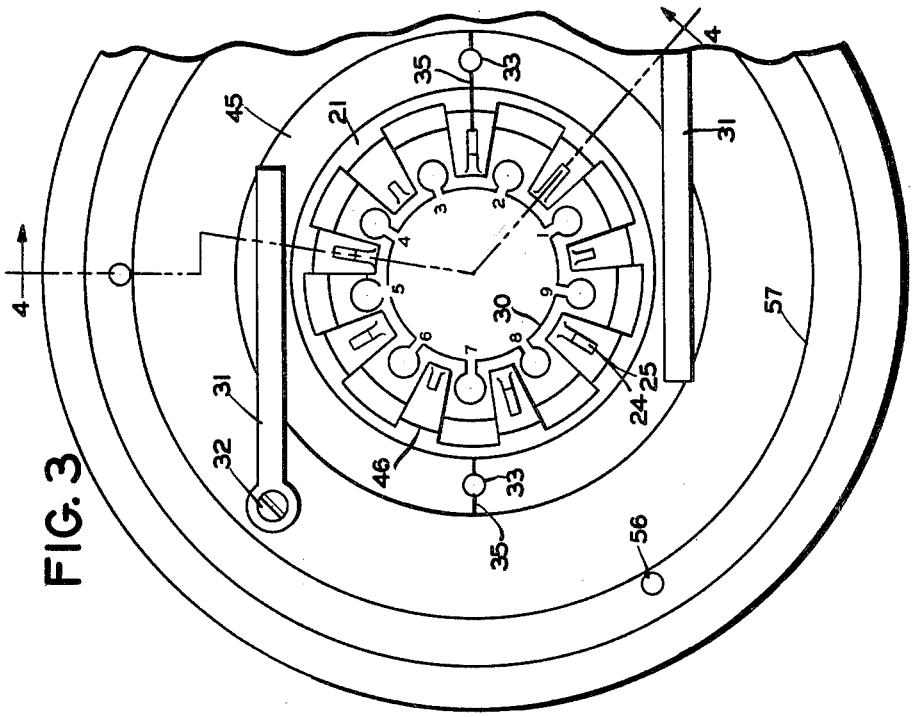
FIGURE 3 is a somewhat modified view of FIGURE 1 for use in conjunction with a different form of severing tool.
Figure 4:
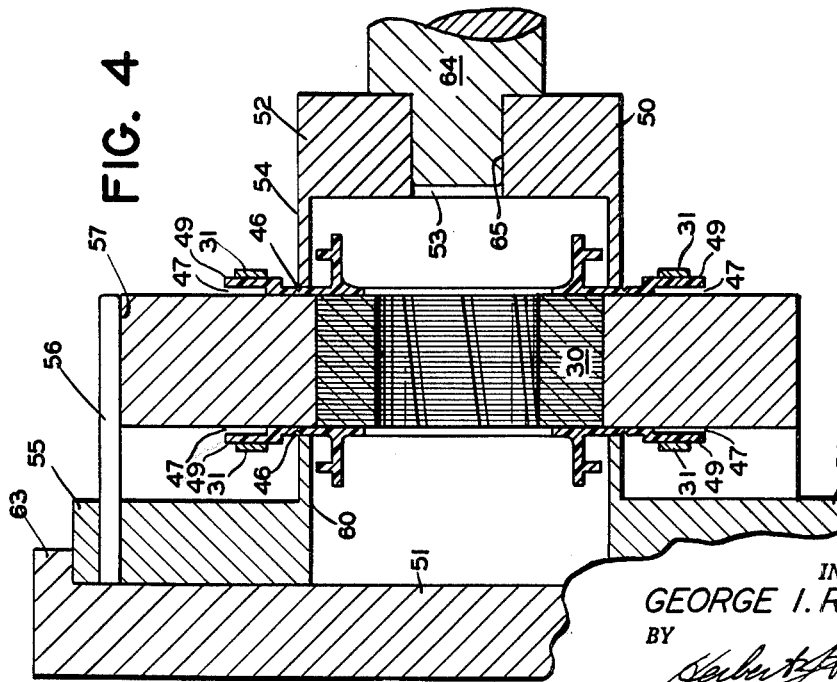
FIGURE 4 is a sectional view taken substantially along lines 4—4 of FIGURE 3 but with a severing tool disposed in operative position.

In FIGURES 3 and 4 the forming ring 45 is quite similar to that shown in FIGURES 1 and 2, being formed slightly beyond the free end of the fingers 25 of the lugs 24. The score lines 35 for severing the forming ring are substantially similar to those shown in FIGURES 1 and 2. However, the score lines 35 are only required when it is desired to break the ring in half for the purpose of removing the stator. Score line 27 of FIGURE 2 is at the opposite side of the forming ring 20 from the lugs and has a diameter less than that of the stator, while score line 46 of FIGURE 4 is at the same side of the forming ring 45 as the lugs and has a diameter larger than the diameter of the stator. The forming ring 45 in FIGURES 3 and 4 has one major difference from that of the forming ring 20 shown in FIGURES 1 and 2, in that said forming ring 45 has a tool channel 47 adapted for receiving a tool, such as 48, shown in FIGURE 7. The forming ring 45 has an annular raised portion 49 adjacent the outer peripheral edge for receiving the tool 48 for breaking the outer portion of the ring 45 in half by inserting the tool 48 in the tool channel 47, while the two forming rings are clamped between the front clamp 50 and the rear clamp 58. The front clamp 50 has a main body 52 with a central bore 53 formed therein and has an annular flange 54 on one end thereof for engaging the forming ring. The rear clamp 58 has a base 55 with three locating pins, such as 56, extending laterally therefrom for engaging the peripheral edge 57 of the stator nest 29 to centralize said stator nest in the fixture. The base 55 has an annular flange 60 for engaging the forming ring 45 disposed on one face of the stator with said flange being positioned substantially opposite the flange 54, which engages the forming ring on the opposed base of the stator. The bed 51 has an annular flange 63 formed thereon so that the rear clamp 58 may be positioned therein. A spindle 64 of a drill press or arbor press has a reduced portion 65 which is inserted in the bore 53. The entire assembly, including the front and rear clamps and the stator, is centralized by the spindle 64 after the front and rear clamps are fitted over the lugs of the forming rings and properly positioned for severing the forming rings. After the front and rear clamps are positioned as shown in FIGURE 4, the tool 48 shown in FIGURE 7 may be inserted in the tool channel 47 so that as pressure is applied by the tool handle in a direction away from the face of the stator, the forming ring may be severed on the score lines, such as 46, and the score lines 35.

After the front and rear clamps have been removed, the lugs may be readily removed from engagement with the stator face and the end turns of the coils of wire.

In FIGURES 5 and 6, there is shown means for cutting or shearing the outer portions of the forming ring 70, which forming ring has an annular flange 71 formed adjacent the outer peripheral edge thereof with said flange engaging a groove 72, one of said grooves being formed in each face of the stator nest 29. The forming ring flange assists in holding the forming ring 70 in fixed relation with the stator nest, while said positioning pin 33 is similar to the positioning pin 33 shown in FIGURE 1. A score or weakened portion 73 is formed at the same side of the forming ring 70 as the lugs in the same manner and for the same purpose as the corresponding score 46 in relation to the forming ring 45, shown in FIGURES 3 and 4. In the present instance, the score 73 is a somewhat greater distance from the axial center of the stator than the outer edge 75 of the stator.

A front cutting tool 76 acts upon the forming ring 70 and has an annular flange 77 formed thereon with an annular cutting tool 78 on the end of the flange for engaging the score 73. The central bore 79 is adapted to receive the spindle 64. The rear cutting tool 80 has a base 81 with locating pins 56 disposed thereon substantially similar to those shown in FIGURES 3 and 4, with said locating pins being used for the same purpose of centralizing the stator nest in relation to the rear cutting tool. Annular flange 82 on the base 81 engages one surface of the stator nest when the annular cutting tool 83 has properly severed the forming ring on the score. The cutting tool 83 is formed with the base 81. The annular cutting tool 78 and the annular cutting tool 83 are substantially opposite each other when the spindle 64 of the drill press is urged downwardly towards the bed 51 when the front and rear cutting tools are properly positioned.

While several embodiments of the invention have been illustrated and described in detail, it is to be expressly understood that the invention is not limited thereto. Various changes may also be made in the design and arrangement of the parts without departing from the spirit of the invention and the scope of the appended claims, as the same will now be understood by those skilled in the art.

What is claimed is:

1. A method for severing a coil form winding element of a type including a pair of preformed end-turn forming members, and each of the members having lug portions removably retained on opposed respective end faces of the apparatus in which the end-turn forming members include stored portions providing predetermined weakened zones to permit removal of the lug portions, a severing device including means for aligning the forming members therewith, and other means including first and second elements positioned at opposed respective end faces, comprising the steps for simultaneously engaging the lug portions of the pair of preformed end-turn forming members adjacent the scored portion, forcing the first and second elements toward the opposed respective end faces of the apparatus, and applying pressure through the first and second elements and adjacent the scored portions so as to effectively sever the forming members adjacent the scored portions and thereupon permit removal of the lug portions at the predetermined weakened zones.

2. The method defined by claim 1 in which the first and second elements include a tool cutting means, and further comprising the steps for simultaneously engaging the forming members immediately adjacent the scored portions, and applying a pressure thereto so as to effectively sever the members at the predetermined weakened zones.

3. The method defined by claim 1 in which each of the first and second elements include a conical surface, and further comprising the steps for centrally disposing the conical surfaces relative to the lugs provided on the members, and axially engaging the portions of the lugs so as to effectively sever the members at the predetermined weakened zones.

4. The method defined by claim 1 in which each of the first and second elements include an annular flange, and further comprising the steps for centrally disposing the annular flanges relative to the lugs provided on the members for simultaneously engaging the forming members immediately adjacent the scored portions, and applying a pressure thereto so as to effectively sever the members at the predetermined weakened zones.

5. The method for severing a coil form winding element of a type including a pair of preformed wire end turn forming members, each member including a plurality of lugs having axially disposed portions, each of the lug including scored portions providing predetermined zone embracing weakened portions of the members, the weakened portions being located on the respective forming members substantially adjacent the area where the lug are joined to the remaining portions of the forming member, and which members are removably retained on opposed respective end faces of the stator of the inductive apparatus, and having engaging means at the opposed end faces including a pair of conical surfaces centrally disposed relative to the lugs; comprising the steps for simultaneously engaging the lugs of the pair of preformed end-turn forming members in the predetermined zone embracing the weakened portions of the members by the engaging means, and drawing the pair of conical surface toward each other while engaging the lugs on the forming members so as to apply a pressure in the predetermined zones to effectively sever the forming members at the scored portions providing the predetermined zones embracing said weakened portions.

6. The method for severing a coil form winding element of a type including a pair of preformed wire end turn forming members, each member including a plurality of lugs having axially disposed portions, each of the lug including scored portions providing predetermined weakened zones embracing weakened portions of the members the weakened portions being located on the respective forming members substantially adjacent the area where the lugs are joined to the remaining portions of the forming member, and which members are removably retained on opposed respective end faces of the stator of the inductive apparatus, and having engaging means at the opposed end faces including a pair of annular flanges positioned adjacent the scored portions of the lugs; comprising the steps for simultaneously engaging the lugs of the pair of preformed end-turn forming members in the predetermined zones embracing the weakened portions of the members by the engaging means, and forcing the pair of annular flanges toward each other while engaging the lugs on the forming member so as to apply a pressure in the predetermined zones to effectively sever the forming members at the scored portions providing the predetermined zones embracing said weakened portions.

7. The method for severing a coil form winding element of a type including a pair of preformed wire end turn forming members, each member including a plurality of lugs having axially disposed portions, each of the lug including scored portions providing predetermined weakened zones embracing weakened portions of the members the weakened portions being located on the respective forming members substantially adjacent the area where the lugs are joined to the remaining portions of the forming member and which members are removably retained on opposed respective end faces of the stator of the inductive apparatus, and having engaging means at the opposed end faces including a pair of annular cutting tools adjacent the scored portions of the lugs; comprising the step for simultaneously engaging the lugs of the pair of preformed end-turn forming members in the predetermined zones embracing the weakened portions of the members by the engaging means, and forcing the annular cutting tools toward each other while engaging the lugs on the forming members so as to effectively sever the forming members at the scored portions providing the predetermined zones embracing said weakened portions No references cited.

UNITED STATES PATENT OFFICE
CERTIFICATE OF CORRECTION

Patent No. 3,168,847                            February 9, 1965

George I. Roberts

It is hereby certified that error appears in the above numbered patent requiring correction and that the said Letters Patent should read as corrected below.

In the grant, lines 1 to 3, for "George I. Roberts, of Maywood, New Jersey," read -- George I. Roberts, of Maywood, New Jersey, assignor to The Bendix Corporation, of Teterboro, New Jersey, a corporation of Delaware, --; line 12, for "George I. Roberts, his heirs" read -- The Bendix Corporation, its successors --; in the heading to the printed specification, line 4, for "George I. Roberts, 356 Concord Drive, Maywood, N. J." read -- George I. Roberts, Maywood, N. J., assignor to The Bendix Corporation, Teterboro, N. J., a corporation of Delaware --.

Signed and sealed this 27th day of July 1965.

(SEAL)
Attest:

ERNEST W. SWIDER                          EDWARD J. BRENNER
Attesting Officer                      Commissioner of Patents